United States Patent [19]
Damke et al.

[11] Patent Number: 5,795,417
[45] Date of Patent: Aug. 18, 1998

[54] PNEUMATIC VEHICLE TIRE HAVING A BREAKER ARRANGEMENT SURROUNDED AT LEAST IN ITS EDGE REGIONS BY AT LEAST ONE COVER PLY AND METHOD OF MAKING THE SAME

[75] Inventors: Roland Damke, Freigericht-Somborn; Manfred Gerresheim, Obertshausen-Hausen; Robert Nau, Hammersbach; Hans-Joachim Winter, Gelnhausen; Bernd Lowenhaupt, Bensheim, all of Germany

[73] Assignee: SP Reifenwerke GmbH, Hanau, Germany

[21] Appl. No.: 517,630

[22] Filed: Aug. 22, 1995

[30] Foreign Application Priority Data

Aug. 23, 1994 [DE] Germany .......................... 44 29 899.4
Feb. 23, 1995 [DE] Germany ........................ 195 06 381.3
Mar. 17, 1995 [DE] Germany ........................ 195 09 824.2

[51] Int. Cl.$^6$ .................. B60C 9/18; B60C 9/20; B60C 9/22; B60C 9/26
[52] U.S. Cl. ................... 152/527; 152/529; 152/531; 152/533; 152/534; 152/535; 152/536; 156/117; 156/123; 156/130
[58] Field of Search .................. 152/527, 531, 152/533, 535, 536, 534, 529; 156/117, 123, 130

[56] References Cited

U.S. PATENT DOCUMENTS

| | | | |
|---|---|---|---|
| 3,774,662 | 11/1973 | Neville et al. | 152/533 X |
| 3,900,062 | 8/1975 | Neville et al. | 152/533 X |
| 3,979,536 | 9/1976 | Neville et al. | 152/533 X |
| 4,094,354 | 6/1978 | Ferrell et al. | 152/533 X |
| 4,098,315 | 7/1978 | Ferrell et al. | 152/533 X |
| 4,201,260 | 5/1980 | Mirtain et al. | 152/531 |
| 4,791,973 | 12/1988 | Davisson | 152/531 X |
| 4,877,073 | 10/1989 | Thise et al. | 152/531 X |
| 4,887,655 | 12/1989 | Imai et al. | |
| 4,947,914 | 8/1990 | Noma et al. | 152/531 |
| 5,032,198 | 7/1991 | Kojima et al. | 152/533 X |
| 5,213,642 | 5/1993 | Sponagel | 152/533 X |
| 5,271,445 | 12/1993 | Kohno et al. | 152/531 X |
| 5,407,701 | 4/1995 | Renter | 152/533 X |
| 5,411,069 | 5/1995 | Tsuda | 152/533 X |
| 5,436,076 | 7/1995 | Nakata et al. | 152/531 X |
| 5,558,144 | 9/1996 | Nakayasu et al. | 152/533 X |

FOREIGN PATENT DOCUMENTS

| | | | |
|---|---|---|---|
| 0235579 | 9/1987 | European Pat. Off. | |
| 0 335 588 | 10/1989 | European Pat. Off. | 152/527 |
| 0407071 | 1/1991 | European Pat. Off. | |
| 0412928 | 2/1991 | European Pat. Off. | |
| 0455453 | 11/1991 | European Pat. Off. | |
| 0561177 | 9/1993 | European Pat. Off. | |
| 0571204 | 11/1993 | European Pat. Off. | |
| 0622252 | 11/1994 | European Pat. Off. | |
| 0792853 | 1/1996 | France. | |
| 4209817 | 9/1993 | Germany. | |
| 2064445 | 6/1981 | United Kingdom. | |

OTHER PUBLICATIONS

F. Kenichi, Abstract of Japanese Patent No. JP2141309 published Nov. 22, 1988.

*Primary Examiner*—Adrienne C. Johnstone

[57] ABSTRACT

A pneumatic vehicle tire comprises a single ply or multi-ply radial carcass anchored to beads, a tread, and a breaker arrangement provided between the carcass and the tread. The breaker arrangement is preferably built up of at least two cut breaker plies with the threads or cords of the cut breaker plies, which serve as strength carriers and extend parallel to one another in the respective ply, crossing at a predetermined angle to the central mid-circumferential plane. The tire also comprises at least one cover ply of cords or threads extending substantially in the circumferential direction of the tire, at least one cover ply surrounding the breaker arrangement at least in the breaker arrangement's edge regions. In the preferred embodiment the breaker arrangement (4) has threads or cords (9) of non-metallic material and a material with a low thermal shrinkage or no thermal shrinkage is used as the material for the treads or cords (8) of the at least one cover ply (5).

38 Claims, 10 Drawing Sheets

Fig. 2
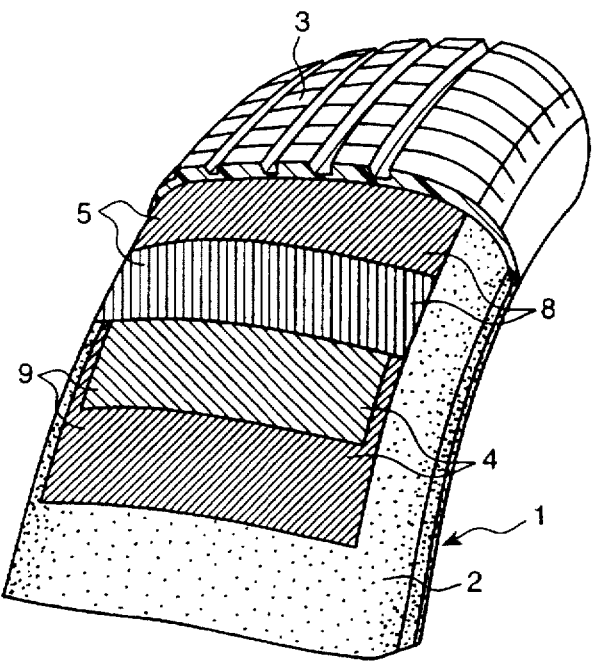
Fig. 3
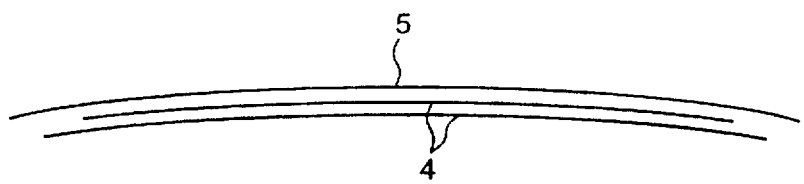
Fig. 4
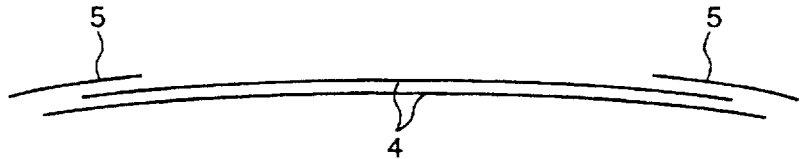
Fig. 5
Fig. 5b
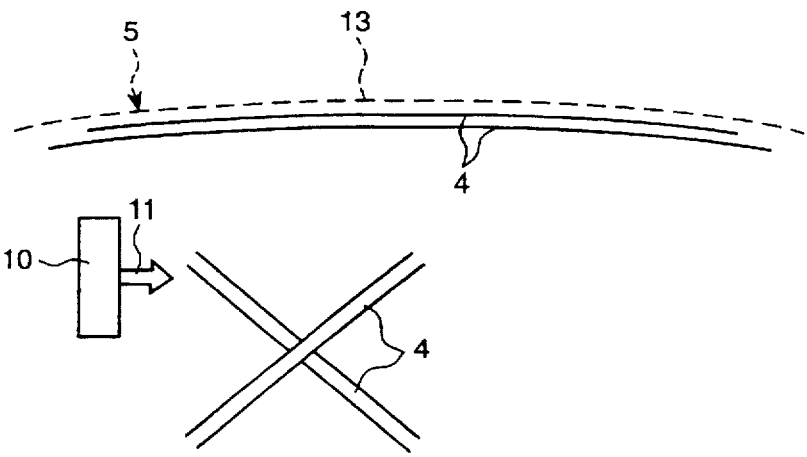

ns or cords of non-metallic
PNEUMATIC VEHICLE TIRE HAVING A BREAKER ARRANGEMENT SURROUNDED AT LEAST IN ITS EDGE REGIONS BY AT LEAST ONE COVER PLY AND METHOD OF MAKING THE SAME The invention relates to a pneumatic vehicle tire comprising a single ply or multi-ply radial carcass anchored to beads, a tread, a breaker arrangement provided between the carcass and the tread, the breaker arrangement preferably being built up of at least two cut breaker plies with the threads or cords of the breaker plies, which serve as strength carriers and extend parallel to one another in the respective ply, crossing at a predetermined angle to the mid-circumferential plane and also comprising at least one cover ply of cords or threads extending substantially in the circumferential direction of the tire, the at least one cover ply surrounding the breaker arrangement at least in the breaker arrangement's edge regions.

BACKGROUND OF THE INVENTION

Whereas the radial carcass forms the support construction of the tire and gives strength to the tire, the breaker arrangement, provided between the carcass and the tread, consists of at least two cut breaker plies, and serves to give the pneumatic vehicle tire the desired driving characteristics, in particular the necessary stability. In order to prevent separation of the breaker arrangement, in particular, at high speeds, this separation predominantly occurring in the edge regions of the breaker plies, the breaker arrangement is, at least in this region, covered over with a cover or bandage layer having threads or cords which extend substantially in the circumferential direction of the tire.

Pneumatic vehicle tires of the named kind are customarily manufactured using a cylindrical drum by laying the individual tire components, such as the carcass and sidewalls, one after the other onto the drum. After the beads have been set in place and the carcass turned over around them, the tire blank is then shaped to a toroid, the breaker plies applied to the tread and then the assembly is placed in a tire mold in which the tire profile is formed and the tire is vulcanized.

In order to finally shape the tire blank into the tire mold, the individual components of the tire must be extensible in order to allow the final stretch of the tire into the tire mold.

On the other hand, an extension of the tire under static or dynamic loading should be avoided as far as possible in the finished tire. While the breaker plies permit an extension to the requisite degree as a result of their cords which are arranged in a crossed arrangement at a predetermined angle to the mid-circumferential plane, this can only be achieved for the cover or bandage ply, with its cords which extend substantially in the circumferential direction of the tire, through a suitable choice of the cord material. However, in this respect, account should additionally be taken of the fact that the cover or bandage ply serves to prevent a separation of the breaker arrangement. Despite the extensibility required for the formation of the tire, the cover or bandage ply must therefore have adequate strength.

Nowadays, breaker plies customarily contain steel cords as reinforcing elements, whereas the cover ply comprises nylon cords. However, the use of steel cords in the breaker arrangement is disadvantageous due to the increasing endeavor to reduce tire weight.

SUMMARY OF THE INVENTION

The invention is thus based on the object of further development of a pneumatic vehicle tire of the initially named kind so that its weight is reduced as much as possible without impairing the required characteristics of the pneumatic vehicle tire.

This object is satisfied in that the threads or cords of the breaker arrangement are threads or cords of non-metallic material; in that a material with low thermal shrinkage or no thermal shrinkage is used as the material for the threads or cords of the cover ply; and in that extension of the tire is ensured into the tire mold during its manufacture, through the choice of the material of the threads or cords of the cover ply alone, or in conjunction with the nature of the build-up and/or of the application of the cover ply and/or through the nature of the build-up of the threads or cords of the cover ply, but additional extension of the tire is prevented.

As a result of the use of non-metallic reinforcing elements instead of steel in the breaker arrangement, the tire weight is advantageously reduced. In order to nevertheless give the tire the desired properties, the cover ply is formed in the given manner.

The choice is thus made so that the extension of the green tire necessary for molding the green tire into the tire mold is possible; so that no shrinkage of the tire occurs on heating up of the completed tire after vulcanization, or during use; and so that extension of the tire under static load (air pressure) or dynamic load (centrifugal force) is counteracted with a force which is as large as possible in order to prevent an undesired growth of the tire.

In contrast to a pure steel radial tire, there is the problem, when non-metallic reinforcing elements are used in the breaker arrangement, that the breaker material has no or only a small bulk modulus. A shrinkage of the cover ply as a result of warming would therefore lead to a deformation of the tire and thus to a worsening of the tire properties leading up to its destruction.

In accordance with the invention, a material for the threads of cords of the cover ply is preferred which has a modulus of elasticity which is as large as possible, at least in the initial range of tire extension, but which still just permits an extension of the tire into the mold during manufacture. An undesired extension of the tire during use is thereby substantially prevented.

Rayon has proved to be a particularly suitable material for the threads or cords of the cover plies. Rayon has a comparably high initial modulus, particularly in comparison to nylon, i.e. a relatively steep gradient of the stress-strain curve (force-extension curve) which is large enough to counteract an undesired extension of the tire but which permits an extension of the tire into the tire mold. Moreover, rayon is practically free of thermal shrinkage.

Polyester may also be used for the threads or cords of the cover ply providing that its modulus of elasticity is sufficiently large and its thermal shrinkage sufficiently small. High-modulus-low-shrinkage polyesters (HMLS) of this kind are already tested.

Furthermore, threads or cords of aramid, or of a hybrid material with aramid, have proved to be advantageous for the cover ply. Aramid and the named hybrid materials are characterized by a particularly high tensile strength and thus prevent undesired tire growth under static or dynamic loading. In this way, the tire of the invention has particularly good fast running characteristics.

The extension of the tire necessary for the forming of the tire tread or profile can be set via the build-up of the cover ply, in particular, via the titer, i.e. the weight related to a specific length, of the threads or cords and their density in the respective ply, via the degree of twist of the cords and via the type of winding of the cover ply. Thus, the extensibility of the tire increases by reducing thread density and reducing titer. In the same way, the extensibility of the cords can be increased by a higher twist. Finally, the winding density and tension of the cover ply also codetermine the extensibility of the tire.

It has surprisingly turned out that when using these measures, even when using high modulus materials, in particular aramid materials, no problems arise during forming of the tire profile.

In any case, the threads or cords of the cover ply are preferably selected to be as thin as possible and as thick as necessary. The weight of the cover ply and thus the tire weight can be reduced in this way.

In a further embodiment of the invention, the breaker arrangement contains cords or threads of textile material, in particular of aramid. Aramid has a particularly high strength combined with a low weight. In comparison to steel, the weight can be significantly reduced. Particularly good tire properties are achieved by the combination of an aramid breaker and a rayon cover ply. In place of aramid, glass fibers or carbon fibers can also be used in the breaker arrangement.

In place of aramid, rayon or HMLS polyester can be used for the reinforcement elements of the breaker arrangement. Good tire properties also result from this approach.

In accordance with a further embodiment of the invention, the geometrical arrangement of the cover ply and/or the thread or cord density in the cover ply are used in addition to the selection of the cord or thread material of the cover ply for achieving the desired extension behavior of the tire.

For example, the cover ply can be provided only in the edge regions of the breaker arrangement where the danger of separation of the breaker arrangement is the highest. Through this arrangement of the cover ply, the extension of the tire into the tire mold in the central axial region is practically unimpaired by the cover ply.

With a cover ply which surrounds the breaker arrangement over its entire width, the threads or cords of the cover ply in the shoulder region of the tire can consist of a material which is essentially non-extensible. In the middle tire region disposed between the two shoulder regions the threads or cords of the cover ply can consist of a material which permits an extension of the tire by a predetermined amount under the conditions which prevail during tire manufacture, but substantially prevents extension of the tire.

Through this differential choice of material for the threads or cords of the cover ply in the shoulder regions, on the one hand, and in the central tire region, on the other hand, the extension of the tire which is necessary for the arching of the tire blank and for the formation of the tire is made possible and the shoulder regions which are particularly endangered by separation effects are strengthened. The use of an essentially inextensible cord material in the shoulder regions is possible because the tire extension which is required here is very low. In the central tire region where a considerable tire extension is necessary a larger extension is made possible by a suitable choice of material. Through adjustment of the permissible extension to the degree required during tire manufacture an extension of the finished tire beyond this dimension can be largely prevented.

Aramid has turned out to be a particularly suitable material for the threads and cords in the shoulder region of the cover ply and rayon for the threads or cords of the cover ply in the central region of the tire. Whereas aramid has only a very low extensibility, rayon permits an extension up to a certain degree but generates a large restraining force for an extension which goes beyond this. The finished tire thereby becomes particularly stable.

The cover ply can be formed in the shoulder regions of the tire and/or in the central region of the tire by a helically wound strip bandage, a so-called jointless band (JLB). The cover ply in the central region of the tire can also be formed as a broad band in accordance with one embodiment of the invention.

The sections of the cover ply in the shoulder regions and in the central tire region can be respectively arranged either abutting one another or overlapping one another. When using a strip bandage for both of the two shoulder regions and also for the central tire region, the single strips of different material can also be directly wound adjoining one another around the tire, that is to say the start of the strip which is wound around the center of the tire is set at the end of the strip wound around the one shoulder region and the start of the strip wound around the second shoulder region is set at the end of the strip wound around the center of the tire. In this manner, a particularly uniform cover ply is obtained and the tire characteristics are improved.

The permissible extension of the cover ply during the manufacture of the tire can be restricted by choice of the cord material in the shoulder regions to a maximum of about 0.1 to 0.5%, in particular to about 0.3%, whereas in the central region of the tire a permissible extension during manufacture, for example in the range of between 2 to 3%, in particular 2.5 to 2.7%, can be set through the choice of the cord material. With this choice, particularly good tire characteristics can be obtained.

These extension relationships can be particularly advantageously set through the combination of aramid in the shoulder regions of the tire, and rayon in the central tire region as materials for the cords of the cover ply. The stress-strain (force-extension) curves of aramid and rayon have a favorable relationship relative to each other for this purpose. That is to say, substantially the same sized forces are required in the shoulder region and in the central region of the tire for the extension of the breaker with the cover ply during the molding of the tire with this choice of material, whereby a uniform molding and harmonious tire characteristics are achieved.

Aramid is preferably used as a material for the threads or cords of the breaker arrangement with this layout of the invention. In this way, the tire weight is kept low. In conjunction with rayon for the threads or cords of the cover ply in the central region of the tire and aramid in the two shoulder regions of the tire, one obtains a particularly advantageous tire assembly with high strength and low weight. Through the use of rayon which has no thermal shrinkage it is ensured that during heating of the tire no deformations arise as a result of the small bulk modulus of textile cut breaker plies. The combination of aramid in the shoulder regions and rayon in the central region of the tire could, however, basically also be used with steel breakers. The tire weight would however then be higher.

The extension behavior of the cover ply, i.e. the modulus of elasticity of the cover ply as a whole, can be directly influenced by the thread or cord density. A high cord or thread density produces a high modulus of elasticity and, correspondingly, a small modulus of elasticity of the cover ply is produced by a small thread or cord density.

A further possibility for influencing the extension behavior of the cover ply through its construction is to alter the winding density and/or the winding tension in order to adjust the extension behavior of the cover ply, i.e. its modulus of elasticity, in a deliberate manner. A large modulus of elasticity of the cover ply can thus be set by a high winding density and/or by a high winding tension whereas, correspondingly, a small modulus of elasticity can be set by a small winding density and/or winding tension.

In accordance with a further embodiment of the invention, the winding density and/or winding tension are selected differently across the width of the tire, with them being preferably selected to be respectively higher or larger in the edge regions of the breaker arrangement. This allows the desired extension behavior, and, in general, the desired properties of the tire to be taken into account particularly well.

As already described, a high modulus of elasticity is necessary in the edge regions of the breaker plies, which correspond to the shoulder regions of the tire, in order to counteract the particularly large danger of separation of the breaker plies here, whereas in the central axial region of the tire a smaller modulus of elasticity of the cover ply is sufficient.

In accordance with a further embodiment of the invention, the setting of the desired extension properties of the cover ply can be achieved via the build-up of the cords or threads of the cover ply by a corresponding selection of the degree of twist of these threads or cords. The cords or threads are given an additional elasticity by increasing their degree of twist in the cover ply thus leading to a reduction of the modulus of elasticity of the cover ply. On the other hand, a larger modulus of elasticity can be produced by a reduced degree of twist.

In order to set the desired extension behavior further, other measures have proved to be particularly suitable. Thus, the cover ply can cover over the entire breaker ply or only a part of it, in particular the two edge regions of the breaker plies. In the first case in particular, the cover ply can also be constructed as a singly-folded twin-ply.

In a cover ply made of helically wound strips, a so-called JLB (jointless band), the individual strip windings can overlap one another and the width of overlap can be selected to be different over the width of the tire. In this manner, the extension properties can also be varied in a controlled manner over the width of the tire. In particular, a large modulus of elasticity of the cover ply can be provided in the shoulder regions of the tire, whereas a small modulus of elasticity can be provided in the central axial region of the tire. This can, for example, be achieved by providing an overlap of the strip windings only in the regions which cover over the two edge regions of the breaker arrangement, or by making this overlap particularly large here.

The winding sense and winding direction of the strip bandage can, in accordance with the further embodiments of the invention, also be different over the width of the tire. In particular, the winding sense and winding direction on one side of the mid-circumferential plane can be opposite to that on the other side (of the mid-circumferential plane. This also allows the tire properties to be influenced in a controlled manner.

In summary, the modulus of elasticity of the cover ply can be adjusted in a controlled manner by using the various measures described above, that is to say, the stress-strain (force-extension) curve of the cover ply can be given a desired characteristic.

Moreover, the breaker arrangement can also be designed in different ways. In particular, one or more of the breaker plies can have a multi-part construction, for instance with a gap in the central axial region. The type and construction of the reinforcing elements of the breaker arrangement can also be used to influence the extension properties of the tire in a similar manner as for the cover ply.

Furthermore, the breaker arrangement can consist, in accordance with the invention, either exclusively of non-metallic breaker plies or can consist of both non-metallic and steel breaker plies (so-called hybrid construction). In both cases, the cover ply design in accordance with the invention has a favorable effect on the tire properties.

In accordance with a further layout of the invention, cords or threads of the same material and with the same titer are used in the breaker plies and in the cover ply. Through this layout, the stocking of materials is made easier and more cost-favorable since only one particular cord need be kept available for each type of tire.

Cords consisting of two twisted aramid threads with a titer of respectively 1670 dtex., i.e. grams per 10,000 meters, and also a cord density in the breaker plies of about 70 to 120 cords per 10 centimeters and in the cover ply of about 60 to 90 cords per 10 centimeters have proved to be particularly suitable, with the breaker arrangement preferably being built-up of two aramid breaker plies and one aramid strip bandage serving as the cover ply.

In accordance with a further embodiment of the invention, the cord density in the breaker plies and in the strips of the cover ply are of the same size. This layout has the advantage that the breaker plies and the strips for the cover ply can be manufactured from a single rubberized ply. A rubberized ply can thus also be manufactured with the desired cords at the required cord density in the form of an endless band from which then both the breaker plies and also the strips for the cover ply can be cut off. In this way, the manufacturing of the tire of the invention is simplified.

A particularly favorable method for the manufacturing of such a pneumatic vehicle tire lies in first manufacturing a rubberized ply with textile cords at the required cord density and in that the strips required for the cover ply are cut-away from this ply at the side margins, whereas the remaining part of the rubberized ply is used for the breaker plies. In this way, a rubberized ply can be manufactured as a continuous band from which then both the strips for the cover ply and also the breaker plies can be cut off. The manufacture is thereby made particularly simple and practically no cutting losses arise.

BRIEF DESCRIPTION OF THE FIGURES

Embodiments of the invention are shown in the figures and are described in the following.

They show:

in FIG. 2, a perspective partial view of a sectioned tire in accordance with the invention;

in FIGS. 3 to 34, various variants of the cover ply in accordance with the invention shown schematically;

in FIGS. 5b and 6b, the direction of strip bandage windings in FIGS. 5 and 6, respectively;

DETAILED DESCRIPTION OF THE INVENTION

Figure 1:
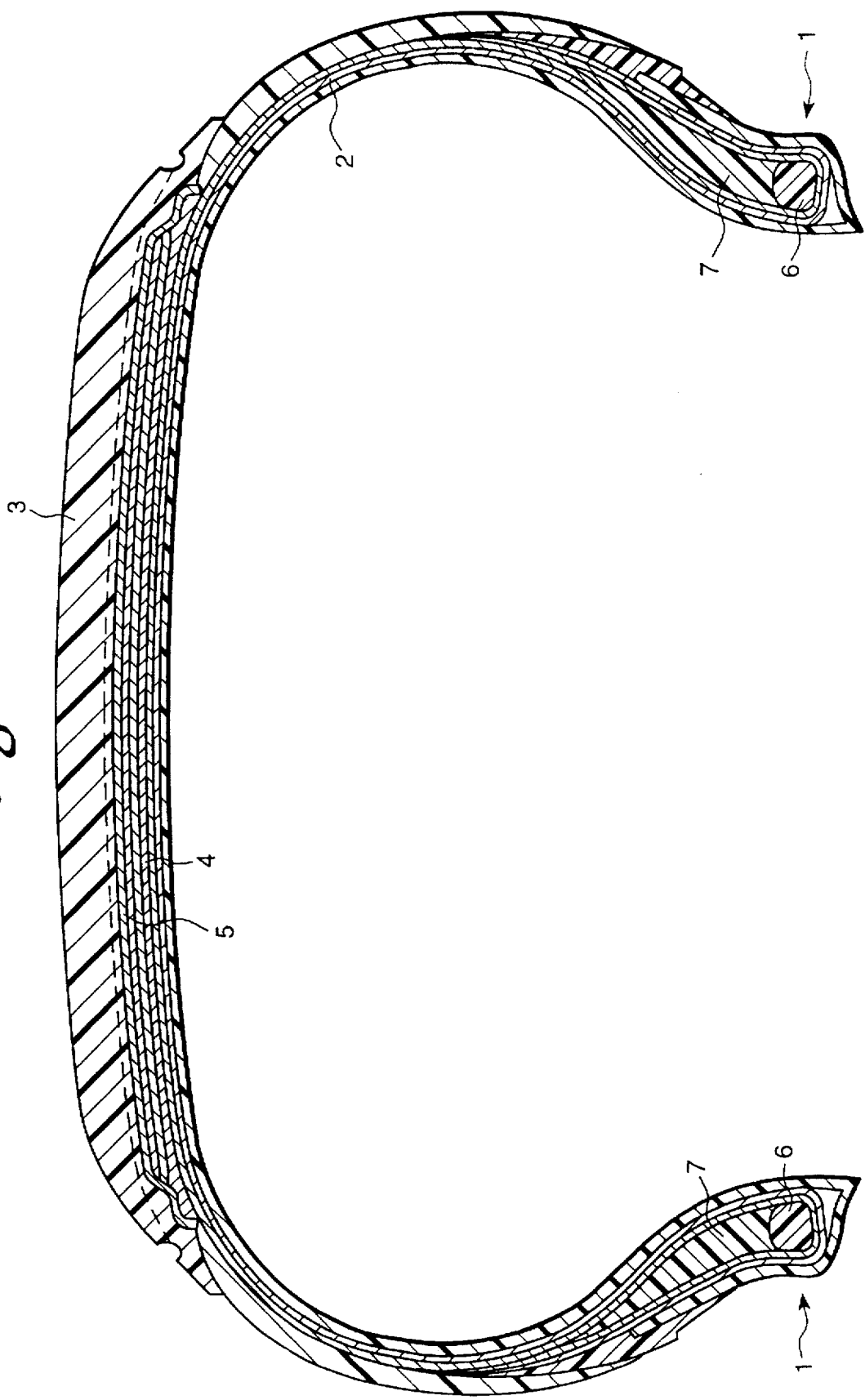
in FIG. 1, a cross-section through a pneumatic vehicle tire in accordance with the invention.

The tire shown in FIG. 1 has a radial carcass 2 anchored to the beads 1, a tread 3 and a breaker arrangement 4 comprising two breaker plies positioned between the carcass 2 and the tread 3, as well as at least one cover ply 5 surrounding the breaker arrangement. The beads 1 are each provided with a bead core 6 on which a bead filler or bead apex 7 is arranged.

It can be seen from FIG. 2 that both the breaker plies of the breaker arrangement 4 and also the at least one cover ply 5 comprise mutually parallel cords or threads 8 and 9 respectively in the respective ply. Whereas the cords or threads 8 of the at least one cover ply 5 extend substantially in the circumferential direction of the tire, the cords or threads 9 of the two breaker plies 4 of the breaker arrangement cross each other at a particular angle relative to the central circumferential plane of the tire.

FIGS. 3 and 4 show the arrangement of the cover ply 5 radially outside the breaker arrangement 4. In FIG. 3 the cover ply 5 surrounds the breaker arrangement 4 over its entire width, whereas in FIG. 4 only the edge regions of the breaker arrangement 4 are surrounded by the cover ply 5 which is now a two-piece cover ply.

Figure 6:
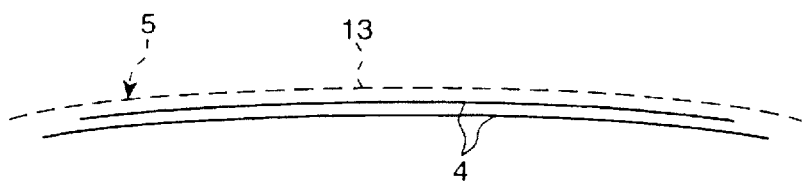
Figure 6B:
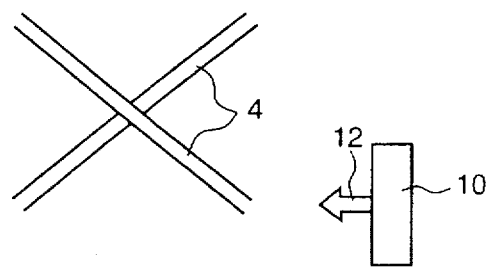

In FIGS. 5 and 6, the cover ply 5 is, in contrast to FIGS. 3 and 4, formed as a helically wound strip bandage (JLB), with the winding of the strip bandage 13 taking place from left to right in FIG. 5 and from right to left in FIG. 6 as is indicated in FIGS. 5b and 6b by the bandage piece 10 and by the arrows 11 and 12 respectively.

Figure 7:
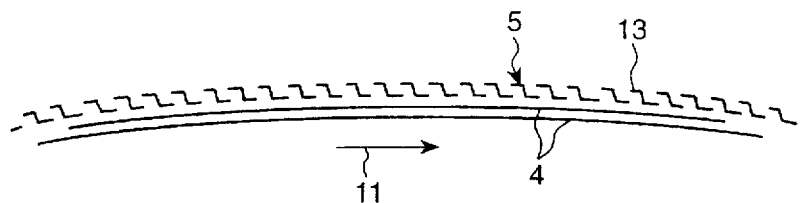
Figure 8:
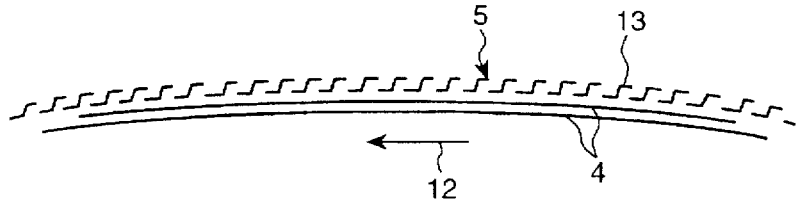

In FIGS. 7 and 8 an embodiment is shown in which the individual windings of the strip bandage 13 overlap, with the winding direction corresponding on the one hand to that of FIG. 5 and on the other hand to that of FIG. 6.

Figure 9:
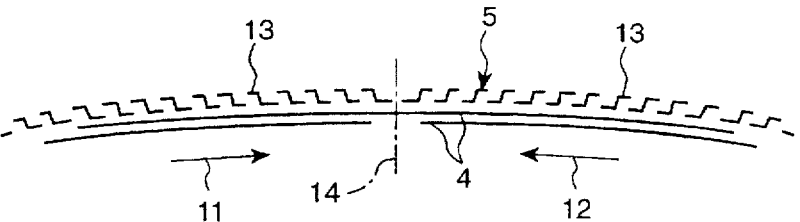
Figure 10:
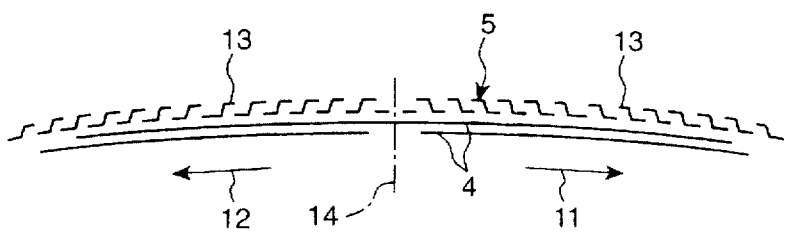
Figure 11:
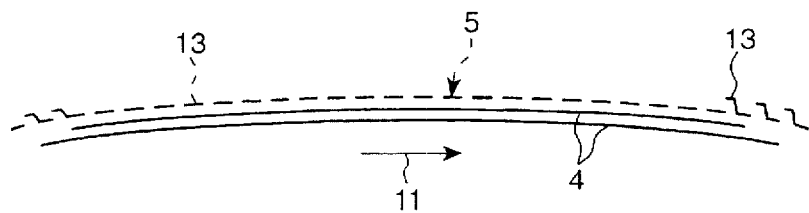
Figure 12:
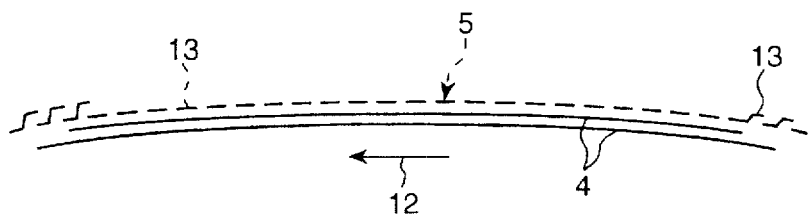
Figure 13:
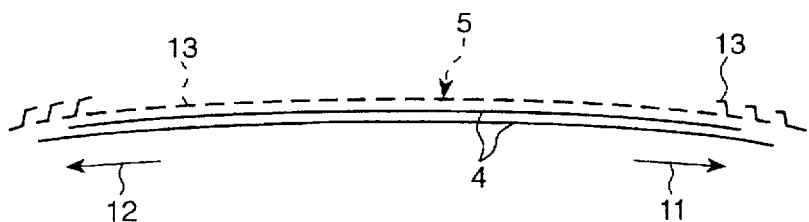
Figure 14:
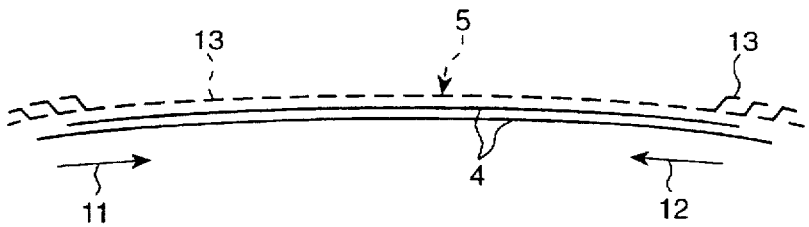
Figure 15:
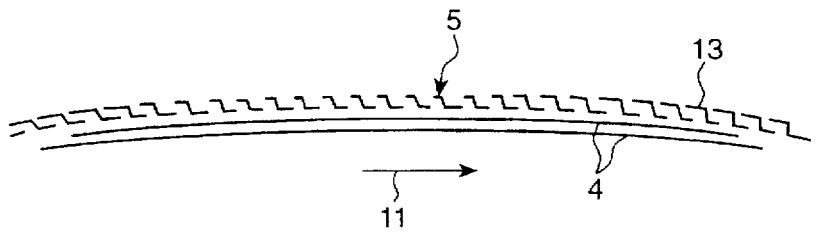
Figure 16:
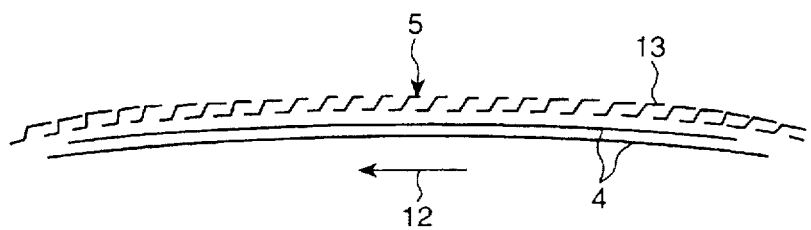
Figure 17:
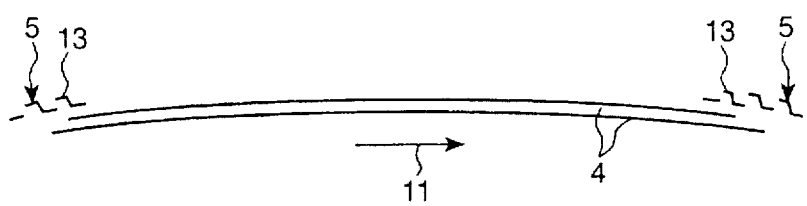
Figure 18:
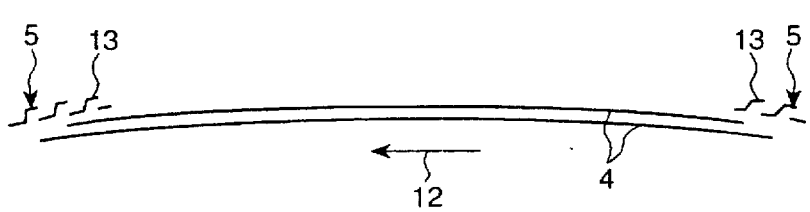
Figure 19:
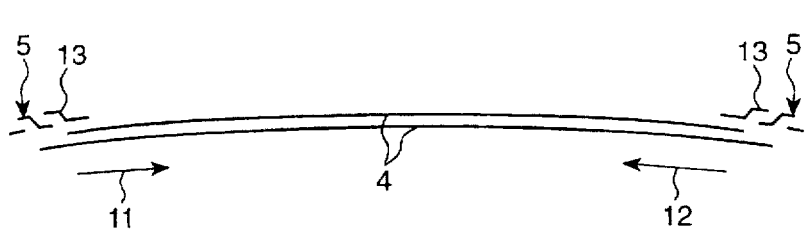
Figure 20:
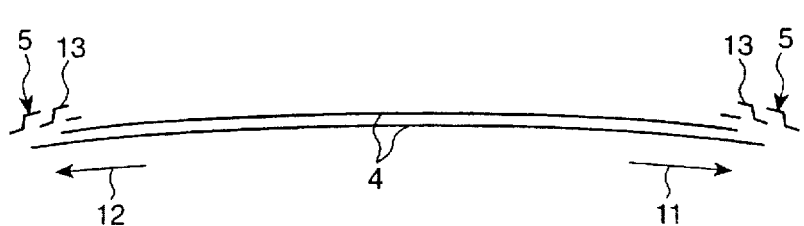
Figure 21:
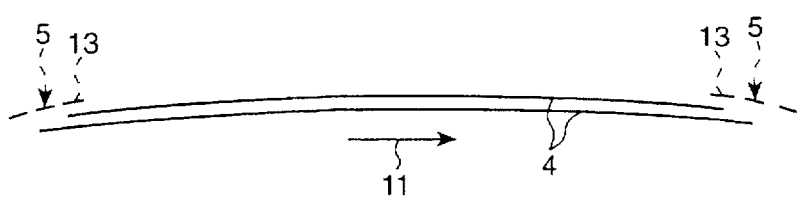
Figure 22:
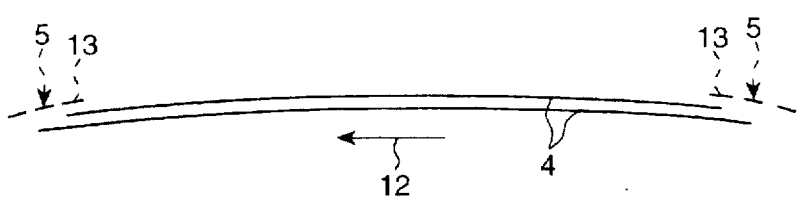
Figure 23:
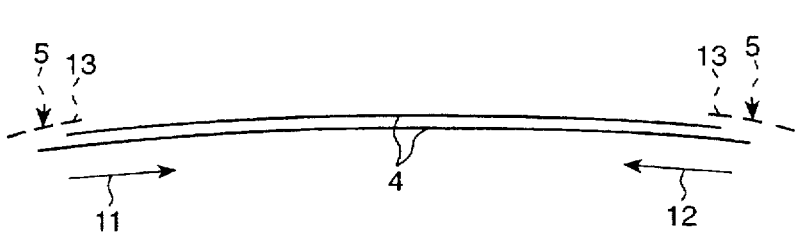
Figure 24:
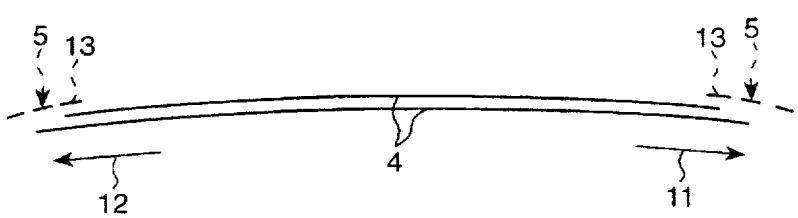
Figure 25:
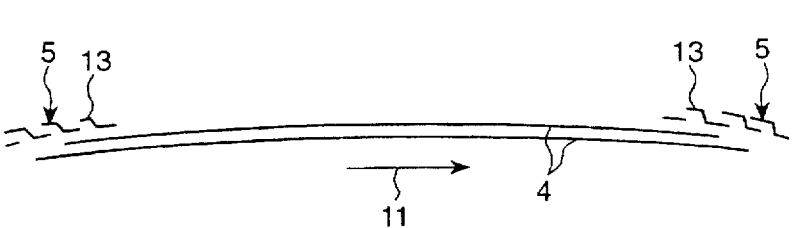
Figure 26:
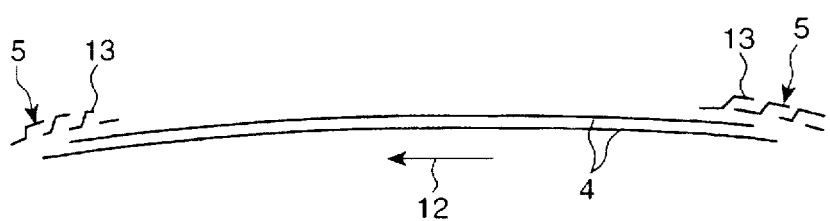
Figure 27:
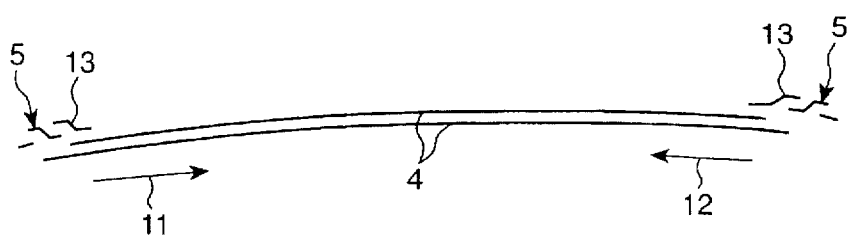
Figure 28:
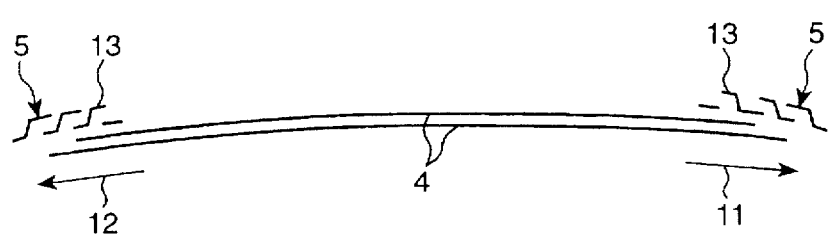
Figure 29:
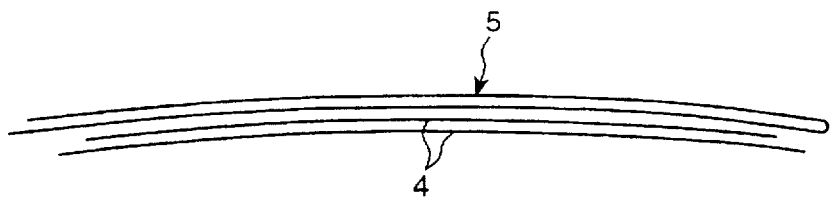
Figure 30:
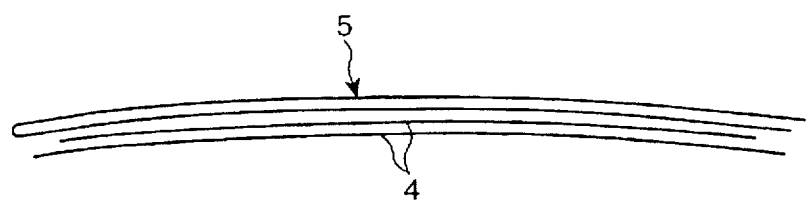

In FIGS. 9 and 10, the winding direction on the left and the right of the central circumferential plane 14 is in each case different. Otherwise, these embodiments correspond to those of FIGS. 7 and 8.

In FIGS. 11 to 16, the overlap between the individual windings of the strip bandage 13 is different over the width of the tire. In FIGS. 11 to 14 an overlap only occurs in the edge regions of the breaker arrangement 4 and the strip bandage 13 is wound in the central axial region in abutting form or with gaps. In contrast, in FIGS. 15 and 16 an overlap occurs over the entire width of the tire, this overlap being larger in the edge regions of the breaker arrangement 4 than in the central axial region of the tire. The winding direction is in each case different as is indicated with the arrows 11 and 12, respectively.

In FIGS. 17 to 28, the cover ply 5 is only provided in the edge regions of the breaker arrangement 4. In FIGS. 17 to 20 each of the individual turns overlap and the winding direction is that indicated by the arrows 11 and 12. In contrast, in FIGS. 21 to 24, the individual turns of the strip bandage do not overlap. The winding direction is also shown here by the arrows 11 and 12. FIGS. 25 to 28 correspond as regards the overlap and the winding direction to FIGS. 17 to 20, but in comparison to these figures have an opposite winding sense.

Figure 31:
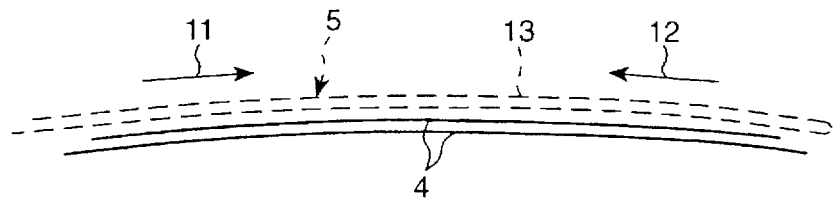
Figure 32:
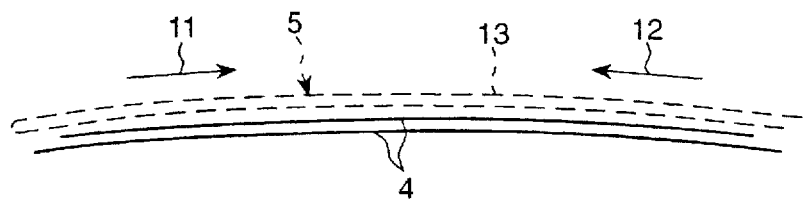

In FIGS. 29 to 32, the cover ply 5 is formed as a twin ply and is folded once either in the left or in the right edge region of the breaker arrangement 4. Although in FIGS. 29 and 30 the cover ply 5 is formed as a broad band, the cover ply 5 shown in FIGS. 31 and 32 is formed as a helically wound strip bandage 13.

Figure 33:
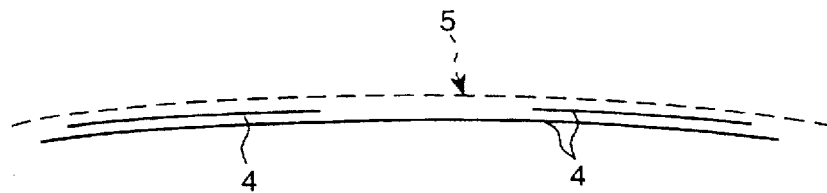
Figure 34:
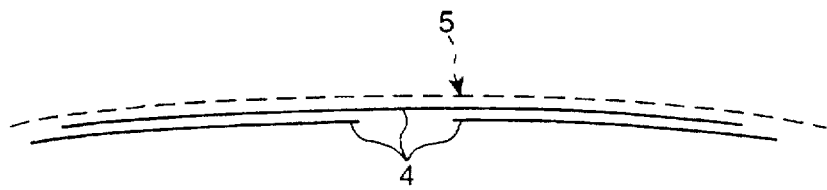

FIGS. 33 and 34 show a cover ply 5 which in each case covers over a breaker arrangement 4 with differently formed breaker plies. In FIG. 33 the radially outer breaker ply is formed in two parts with a gap lying in the central axial region of the tire. In contrast, in FIG. 34, it is the radially inner breaker ply which is formed in two parts and has such a gap.

Figure 35:
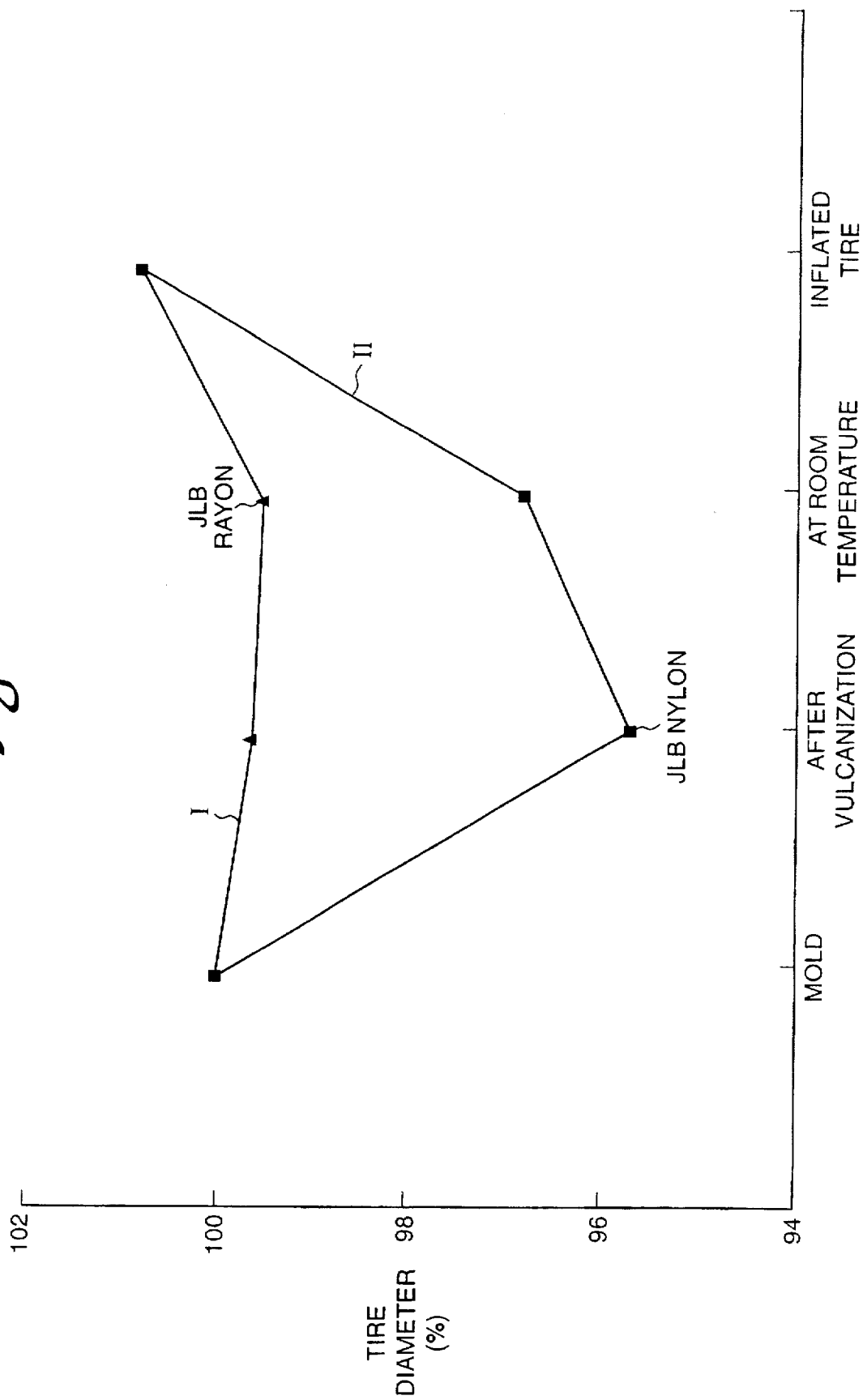
in FIG. 35, a strain or extension diagram of tires with textile breaker plies and with various cover plies in comparison.

The diagram of FIG. 35 shows the effect which can be achieved with a cover ply 5 in accordance with the invention. The change of the tire diameter of a pneumatic vehicle tire with textile breaker plies is shown and indeed, firstly, for a tire in accordance with the invention with a strip bandage with rayon cords (curve I) and secondly for a tire with a strip bandage of nylon cords (curve II). The tire diameter is shown at various stages of the tire manufacture as well as for the completed tire at room temperature and when pumped up. The tire diameter is given here as a percentage of the diameter of the green tire.

One can see that with a tire in accordance with the invention with a rayon cover ply (curve I) the tire diameter remains almost unchanged throughout tire production. On pumping the tire up, its circumference increases by a small amount.

For a tire with a nylon cover ply (curve II) the tire diameter reduces by a considerably amount during vulcanization due to the thermal shrinkage of the nylon. The tire first reaches approximately the diameter of the tire with a rayon cover ply when pumped up.

Figure 36:
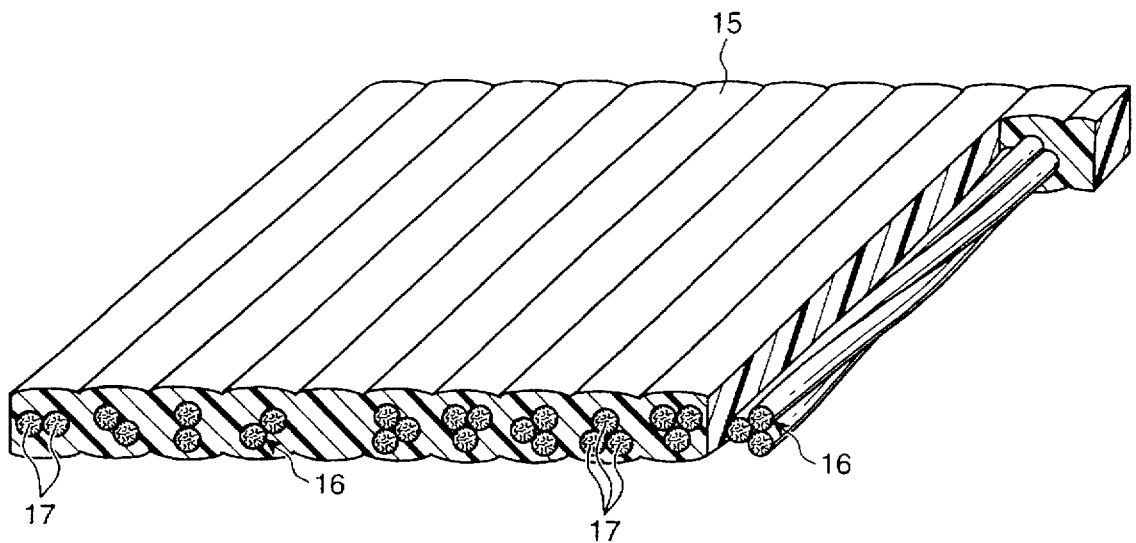
in FIG. 36, a perspective illustration of a rubberized ply for use in the tire in accordance with FIG. 1.

The strip bandage 13 can be cut off from a rubberized ply 15 from which the cut breaker plies of the breaker arrangement 4 are also manufactured. A rubberized ply 15 of this kind is shown in FIG. 36. The rubberized ply 15 has cords 16 which extend parallel to one another and which are formed in the illustrated example of two or three threads 17 which are twisted together. The cords 16 are enveloped with a rubber mixture which was selected in accordance with the desired characteristics of the rubberized ply. The rubberized ply 15 however normally contains only cords 16 of two threads 17 or only cords 16 of three threads 17. FIG. 36 thus only serves to illustrate various possibilities.

The cords 16 of the rubberized ply 15 can for example consist of two aramid threads which are twisted together and the titer of which amounts to 1670 dtex. The cord density in the rubberized layer 15 can preferably amount to between 70 and 120 cords per 10 centimeters.

The strips for the strip bandage 13 can be cut off from the marginal regions of the rubberized layer 15. The remaining part of the rubberized layer 15 is then used for the cut breaker plies of the breaker arrangement 4, with the remaining part of the rubberized ply 15 being cut for this purpose into individual cut breaker plies at an angle which corresponds to the desired cord angle of the respective cut breaker ply relative to the mid-circumferential plane 14.

Figure 37:
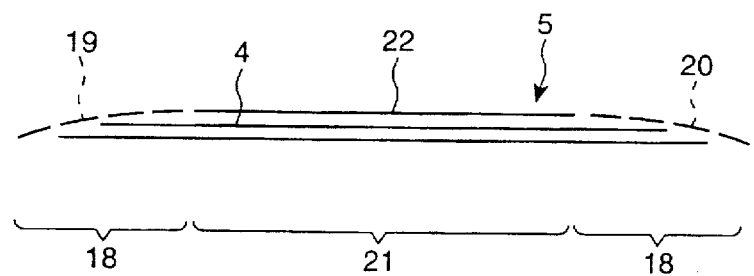
in FIG. 37, a schematic illustration of a first variant of a breaker and cover ply arrangement in accordance with the invention to a scale reduced relative to FIG. 1; and in FIG. 38, a further variant of a breaker and cover ply arrangement in accordance with the invention in an illustration corresponding to FIG. 37.

A further possible layout of the cover ply 5 is shown in FIG. 37. Here the cover ply 5 is formed in each of the two shoulder regions 18 by a respective helically wound strip bandage 19 and 20 respectively, and in the central tire region 21 lying between them by a broad band 22. The two strip bandages 19 and 20 preferably have threads or cords of aramid, while the broad band 22 is provided with threads or cords of rayon.

The individual windings of the strip bandage 19 and 20 can also be arranged abutting one another or overlapping one another, other than in the schematic illustration of FIG. 37. In just the same way, the two strip bandages 19 and 20 can be respectively arranged abutting the broad band 22 or can overlap the latter, with the strip bandages 19 and 20 or the broad band 22 being arranged radially outwardly as desired.

Figure 38:
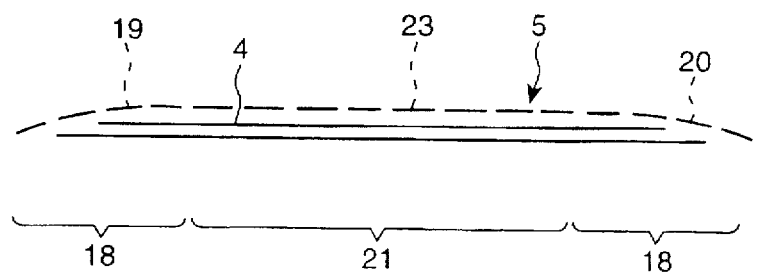

In the variant illustrated in FIG. 38, a strip bandage 23 is also provided as the cover ply 5 in the central region 21 of the tire, in addition to the two strip bandages 19 and 20 in the two shoulder regions 18 of the tire. With this layout, the individual turns of the strip bandages 19 and 20 can be wound abutting or overlapping one another in a manner different from that illustrated. In just the same way, the individual turns of the strip bandage 23 present in the central region of the region 21 of the tire can be arranged abutting or overlapping one another in a different manner from that illustrated.

The turns of the strip bandage 19 or 20 adjacent to the strip bandage 23 can respectively overlap the adjacent turns of the strip bandage 23 or can be overlapped by the latter or be wound abutting the latter. It is, however, also possible to place the start of the strip bandage 23 directly at the confronting end of the strip bandage 19 and to place the start of the strip bandage 20 directly at the end of the strip bandage 23. In this manner, a particularly uniform cover ply 5 arises. The threads or cords of the strip bandages 19 and 20 also preferably consist of aramid in this variant, whereas the threads or cords of the strip bandage 23 are again preferably formed of rayon. A breaker arrangement 4 has in both variants preferably threads or cords of aramid. In this way, a particularly light and strong breaker arrangement is achieved.

The cover ply 5 is preferably so designed that under the condition which exists during tire manufacture, in particular with the usual pressure during shaping of approximately 20 bar, a maximum extension of about 0.1 to 0.5% in particular 0.3% is possible in the two shoulder regions 18 of the tire, whereas in the central tire region 21 a possible extension is set in the range from 2 to 3%, in particular 2.5 to 2.7%. Through this choice, it is possible to ensure the extension required for the shaping into the tire mold of the tire blank built up on the cylindrical building drum in the middle tire region 21, whereas in the shoulder regions 18, where practically no extension is necessary, a particularly firm covering over of the breaker arrangement 4 is achieved. In the mid-region 21 of the tire, this choice moreover counteracts further extension so that in the finished tire a good strength of the breaker arrangement 4 is also given in the central region 21 of the tire.

The regions of the cover ply 5 with aramid threads or cords can in all embodiments cover over the breaker arrangement 4 from approximately 10% up to approximately 35 to 40%. The central region of the tire accordingly extends over about 60 to 90% of the breaker arrangement 4.

The invention therefore allows a light tire to be manufactured in an inexpensive manner which fulfills all the requirements for a modern tire.

Further variations of the construction of the cover ply 5, of the arrangement of the cover ply 5 on the breaker ply 4 as well as of the materials used are, of course, possible within the scope of the invention. What always matters is to adjust the stress-strain (force-extension) curve of the cover ply 5 by varying the parameters indicated so that the desired extension behavior of the tire is achieved, i.e. one which, on the one hand, allows the tire to be manufactured in a satisfactory manner with a clean formation of the tire profile and, on the other hand, results in optimum tire properties.

Having now described our invention what we claim is:

1. A pneumatic vehicle tire comprising:
   a single ply, or multi-ply radial carcass anchored to beads,
   a tread,
   a breaker arrangement provided between the carcass and the tread, the breaker arrangement being built up of at least two cut breaker plies with the threads or cords of the cut breaker plies, which serve as strength carriers and extend parallel to one another in the respective ply, crossing at a predetermined angle to the central mid-circumferential plane of the tire, and
   at least one cover ply of threads or cords extending substantially in the circumferential direction of the tire, the at least one cover ply surrounding the breaker arrangement in the two shoulder regions (18) of the tire including the breaker arrangement's edge regions and in the central region (21) of the tire axially between the shoulder regions, wherein
   the threads or cords (9) in the breaker arrangement (4) are of non-metallic material; a material with a low thermal shrinkage or no thermal shrinkage is used as the material for the threads or cords (8) of the at least one cover ply (5); and extension of the tire into its tire mold during the tire's manufacture is ensured through the choice of the material of the threads or cords (8) of the at least one cover ply (5) alone, or in conjunction with at least one of the group consisting of the nature of the construction of the at least one cover ply (5), the application of the at least one cover ply (5), and the nature of the construction of the threads or cords (8) of the at least one cover ply (5), but additional extension of the tire is prevented, and
   wherein the at least one cover ply (5) has, in the two shoulder regions (18) of the tire, an extensibility of at most about 0.1 to 0.5% and, in the central region (21) of the tire, an extensibility in the range of from 2 to 3%.

2. The pneumatic vehicle tire in accordance with claim 1, wherein the material with a low thermal shrinkage or no thermal shrinkage used as the material for the threads or cords (8) of the at least one cover ply (5) is a material with the largest possible initial modulus of elasticity and only just permits the extension of the tire into its tire mold during the tire's manufacture.

3. The pneumatic vehicle tire in accordance with claim 1, wherein the threads or cords (8) of the at least one cover ply (5) include threads or cords (8) of rayon.

4. The pneumatic vehicle tire in accordance with claim 1, wherein the threads or cords (8) of the at least one cover ply (5) include threads or cords (8) of a polyester with a high modulus of elasticity and low thermal shrinkage (HMLS polyester).

5. The pneumatic vehicle tire in accordance with claim 1, wherein the threads or cords (8) of the at least one cover ply (5) include threads or cords (8) of aramid or of a hybrid material with aramid.

6. The pneumatic vehicle tire in accordance with claim 1, wherein the winding density and/or winding tension of the threads or cords of the at least one cover ply are different over the width of the tire with the winding density and/or winding tension being greater in the breaker arrangement's edge regions.

7. The pneumatic vehicle tire in accordance with claim 1, wherein the at least one cover ply (5) is formed as a broad band.

8. The pneumatic vehicle tire in accordance with claim 7, wherein the at least one cover ply (5) is formed by simple folding forming a double ply.

9. The pneumatic vehicle tire in accordance with claim 1, wherein the at least one cover ply (5) surrounds the breaker arrangement (4) over its entire width.

10. The pneumatic vehicle tire in accordance with claim 9, wherein the threads or cords (8) of the at least one cover ply (5) in the two shoulder regions (18) of the tire consist of a material which is essentially non-extensible and consist in the central tire region (21) disposed between the two shoulder regions (18) of a material which permits an extension of the tire by a predetermined amount under the conditions which are present during the tire's manufacture but which substantially prevents an additional extension of the tire.

11. The pneumatic vehicle tire in accordance with claim 10, wherein the threads or cords (8) of the at least one cover ply (5) consist of aramid in the shoulder regions (18) and of rayon in the central region (21) of the tire.

12. The pneumatic vehicle tire in accordance with claim 10, wherein the at least one cover ply (5) in the shoulder regions (18) is formed as a helically wound strip bandage (19,20).

13. The pneumatic vehicle tire in accordance with claim 10, wherein the at least one cover ply (5) in the central tire region (21) is formed as a helically wound strip bandage (23).

14. The pneumatic vehicle tire in accordance with claim 10, wherein the at least one cover ply (5) in the central tire region (21) is formed as a broad band (22).

15. The pneumatic vehicle tire in accordance with claim 10, wherein the sections of the at least one cover ply (5) in the two shoulder regions (18) of the tire are arranged abutting the section of the at least one cover ply (5) in the central region (21) of the tire.

16. The pneumatic vehicle tire in accordance with claim 10, wherein the sections of the at least one cover ply (5) in the two shoulder regions (18) are arranged overlapping the section of the at least one cover ply (5) in the central tire region (21).

17. The pneumatic vehicle tire in accordance with claim 1, wherein the threads or cords (9) in the breaker arrangement (4) are of glass fiber.

18. The pneumatic vehicle in accordance with claim 1, wherein the threads or cords (9) in the breaker arrangement (4) are of carbon fiber.

19. The pneumatic vehicle tire in accordance with claim 1, wherein the threads or cords (9) in the breaker arrangement (4) and the threads or cords (8) of the at least one cover ply (5) are threads or cords (16) of the same materials and with the same titer.

20. The pneumatic vehicle tire in accordance with claim 19, wherein the thread or cord density is the same in the individual breaker plies of the breaker arrangement (4) and in the at least one cover ply (5).

21. The pneumatic vehicle tire in accordance with claim 19, wherein the breaker arrangement (4) is built up of two breaker plies of aramid threads or cords and the at least one cover ply (5) is formed as a helically wound strip bandage (13) of aramid threads or cords.

22. The pneumatic vehicle tire in accordance with claim 21, wherein the threads or cords of the breaker ply and at least one cover ply are cords (16) of two intertwined aramid threads (17), each having a titer of 1670 dtex, the cord densities in the individual breaker plies of the breaker arrangement (4) amount to approximately 70 to 120 cords per 10 cm, and in the at least one cover ply (5) the cord density amounts to approximately 60 to 90 cords per 10 cm.

23. The pneumatic vehicle tire in accordance with claim 1, wherein the at least one cover ply (5) is formed as a helically wound strip bandage (13).

24. The pneumatic vehicle tire in accordance with claim 23, wherein at least some of the adjacent windings of the strip bandage (13) overlap.

25. The pneumatic vehicle tire in accordance with claim 24, wherein the width of overlap differs over the width of the tire.

26. The pneumatic vehicle tire in accordance with claim 25, wherein overlap of the strip bandage (13) is only present in the regions of the at least one cover ply (5) which cover over the breaker arrangement's edge regions.

27. The pneumatic tire in accordance with claim 23, wherein the sense of winding of the strip bandage (13) is different over the width of the tire.

28. The pneumatic vehicle tire in accordance with claim 27, wherein the sense of winding on one side of the mid-circumferential plane (14) is opposed to the sense of winding on the other side of the mid-circumferential plane (14).

29. The pneumatic vehicle tire in accordance with claim 23, wherein the winding direction of the strip bandage (13) is different over the width of the tire.

30. The pneumatic tire in accordance with claim 29, wherein the winding direction on one side of the mid-circumferential plane (14) is opposed to the winding direction on the other side of the mid-circumferential plane (14).

31. The pneumatic vehicle tire in accordance with claim 1, wherein the threads or cords (9) in the breaker arrangement (4) are of textile material.

32. The pneumatic vehicle tire in accordance with claim 31, wherein the threads or cords (9) in the breaker arrangement (4) are of rayon.

33. The pneumatic vehicle tire in accordance with claim 31, wherein the threads or cords (9) in the breaker arrangement (4) are of HMLS polyester.

34. The pneumatic vehicle tire in accordance with claim 31, wherein the threads or cords (9) in the breaker arrangement (4) are of aramid.

35. A method of manufacturing a tire comprising the steps of:

assembling a plurality of tire components into a tire blank, said tire blank comprising a single ply or multi-ply radial carcass anchored to beads, a tread, a breaker arrangement provided between the carcass and the tread, the breaker arrangement being built up of at least two cut breaker plies with the threads or cords of the cut breaker plies, which serve as strength carriers and extend parallel to one another in the respective ply, crossing at a predetermined angle to the central mid-circumferential plane of the tire, the threads or cords (9) in the breaker arrangement (4) being of a non-metallic material, and at least one cover ply of threads or cords extending substantially in the circumferential direction of the tire, the at least one cover ply surrounding the breaker arrangement in the two shoulder regions (18) of the tire including the breaker arrangement's edge regions and in the central region (21) of the tire axially between the shoulder regions, the threads or cords (8) of the at least one cover ply (5) being of a material of low thermal shrinkage or no thermal shrinkage; and molding the tire blank in a tire mold, wherein the step of assembling includes a step of ensuring extension of the tire into the mold, but preventing additional extension of the tire through the choice of the material of the threads or cords (8) of the at least one cover ply (5) alone, or in conjunction with at least one of the group consisting of the nature of the construction of the at least one cover ply (5), the application of the at least one cover ply (5), the nature of the construction of the threads or cords (8) of the at least one cover ply (5), and the nature of the build-up of the breaker arrangement (4), such that the at least one cover ply (5) has, in the two shoulder regions (18) of the tire, an extensibility of at most about 0.1 to 0.5% and, in the central region (21) of the tire, an extensibility in the range of from 2 to 3%.

36. The method in accordance with claim 35, wherein the step of ensuring includes choosing the nature of the construction of the threads or cords (8) of the at least one cover ply (5) so that the threads or cords (8) of the at least one cover ply (5) are as thin as possible and as thick as necessary and/or the threads or cords (8) of the at least one cover ply (5) are twisted to a predetermined degree.

37. The method in accordance with claim 35, wherein the step of ensuring includes choosing the nature of the construction of the at least one cover ply (5) by choosing at least one of the group consisting of the geometrical arrangement of the at least one cover ply (5), the thread or cord density in the at least one cover ply (5) and the winding density and or winding tension of the at least one cover ply (5).

38. The method in accordance with claim 35, wherein the step of ensuring includes choosing the nature of the built-up of the breaker arrangement (4) by choosing the nature of the type and/or construction of the threads or cords (9) of the breaker arrangement (4).

* * * * *